US010990333B1

(12) United States Patent
Murugan et al.

(10) Patent No.: US 10,990,333 B1
(45) Date of Patent: Apr. 27, 2021

(54) METHODS AND SYSTEMS FOR PROVIDING AN ALTERNATE MEDIA SIZE OPTION FOR A PRINT JOB AND HANDLING THE SAME

(71) Applicant: XEROX CORPORATION, Norwalk, CT (US)

(72) Inventors: Rajesh Murugan, Theni (IN); RakeshKumar Rajamohan, Tuticorin (IN); Ajaikumar Murugesan, Theni (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/677,716

(22) Filed: Nov. 8, 2019

(51) Int. Cl.
*G06F 15/00* (2006.01)
*G06F 3/12* (2006.01)

(52) U.S. Cl.
CPC .......... *G06F 3/1208* (2013.01); *G06F 3/1256* (2013.01); *G06F 3/1258* (2013.01)

(58) Field of Classification Search
CPC ..... G06F 3/1208; G06F 3/1256; G06F 3/1258
USPC ........................................................ 358/1.15
See application file for complete search history.

(56) References Cited

U.S. PATENT DOCUMENTS

| 2003/0223363 | A1* | 12/2003 | Sato | ............... | H04N 1/4413 |
| | | | | | 370/230 |
| 2017/0277986 | A1* | 9/2017 | Hanamura | ......... | G06K 15/4065 |

* cited by examiner

*Primary Examiner* — Mark R Milia

(57) ABSTRACT

According to aspects illustrated herein, a method of printing a document is disclosed. The method includes receiving a request for printing a document and one or more print parameters, the one or more print parameters include at least a primary media size selected by a user for printing. While submitting the document for printing, an option is provided to the user to select an alternate media size to be used for printing the document. The document, the one or more print parameters along with the alternate media size as selected by the user are sent to a printer. Before printing the document, a count of the primary media size sheets available with the printer is estimated. Based on the estimated count, the document is printed with the alternate media size sheets.

26 Claims, 10 Drawing Sheets

METHODS AND SYSTEMS FOR PROVIDING AN ALTERNATE MEDIA SIZE OPTION FOR A PRINT JOB AND HANDLING THE SAME

TECHNICAL FIELD

The presently disclosed subject matter relates to the field of printing, and more particularly to methods and systems for providing an alternate media size option to a user for a print job and handling the same.

BACKGROUND

When a user submits a document for printing via his computing device, a number of print parameters needs to be provided by the user. Few examples are paper size, custom margins, print single side or both sides, black & white print, color print, media type, and so on. The computing device creates a print ticket, includes all print parameters in the print ticket and sends to a printer for printing. The printer prints the document in accordance with the print parameters as included in the print ticket. There are scenarios when the user has submitted the print job with a paper size, for example, A3 and the number of A3 size papers available with the printer are less, i.e., tray level of the printer is low. In such cases, the print job is printed partially and is put in held state for resources status. As a result, the user either sends the print job again to another printer having sufficient paper availability as required. Or the user reaches the printer, fills the printer with the required paper sizes, i.e., A3. This approach requires manual effort and time of the user. Moreover, the print job is put on hold for the time being. Currently, there are no solutions available in the market to print the job of the user without any intervention from the user when such scenarios occur, i.e., when the required paper to print the job is finished/less/unavailable etc. Hence, there arises a need for methods and systems for solving the above mentioned problems.

SUMMARY

According to aspects illustrated herein, a method for printing a document is disclosed. The method includes receiving a request for printing a document and one or more print parameters for printing, the one or more print parameters include at least a primary media size selected by a user for printing the document. An alternate media option is provided to the user to select an alternate media size to be used for printing the document. The document, the one or more print parameters and the alternate media size selected by the user are sent to a printer. Before printing the document, a count of the primary media size sheets available with the printer is estimated. Based on the estimated count, the document is printed with the alternate media size sheets.

According to further aspects illustrated herein, a method for printing a print job at a printer is disclosed. The method includes receiving a selection of a print job with one or more print parameters, the one or more print parameters include at least a primary media size for printing, the print job includes a document having a plurality of pages; providing an option to the user to select an alternate media size to be used for printing the document; calculating the total number of pages of the document to be printed; before initiating processing the print job, checking the availability of the primary media size sheets at the printer for printing the document; and based on the availability of the primary media size sheets at the printer, printing the document with the alternate media size sheets. In this manner, the method allows printing the print job without any intervention.

According to further aspects illustrated herein, a system including a computing device having a print driver and a printer communicatively coupled to the computing device is disclosed. The print driver is to receive a request for printing a document and one or more print parameters, the one or more print parameters include at least a primary media size selected by a user for printing; provide an option to the user to select an alternate media size to be used for printing the document; send the document, the one or more print parameters along with the alternate media size selected by the user to a printer. The printer includes a first tray including a plurality of primary media size sheets and a second tray including a plurality of alternate media size sheets. The printer is to receive the document, the one or more print parameters along with the alternate media size selected by the user; before printing the document, estimate a count of the primary media size sheets available in the first tray; and based on the estimated count, print the document with the alternate media size sheets in the second tray.

According to additional aspects illustrated herein, a printer for printing a document is disclosed. The printer includes a first tray, a second tray, a user interface and a controller. The first tray includes a plurality of primary media size sheets. The second tray includes a plurality of alternate media size sheets. The user interface is to allow a user to select a print job and one or more print parameters, the one or more print parameters include at least a primary media size, the print job includes a document having a plurality of pages; and allow the user to select an alternate media size to be used for printing the document. The controller is to receive the print job with the one or more print parameters and the alternate media size to be used for printing the document; calculate the total number of pages to be printed; before processing the print job, check the availability of the primary media size sheets available in the first tray for printing the document; based on the availability of the primary media size sheets in the first tray, print the document with the alternate media size sheets available in the second tray, wherein the printer prints the print job without any intervention.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
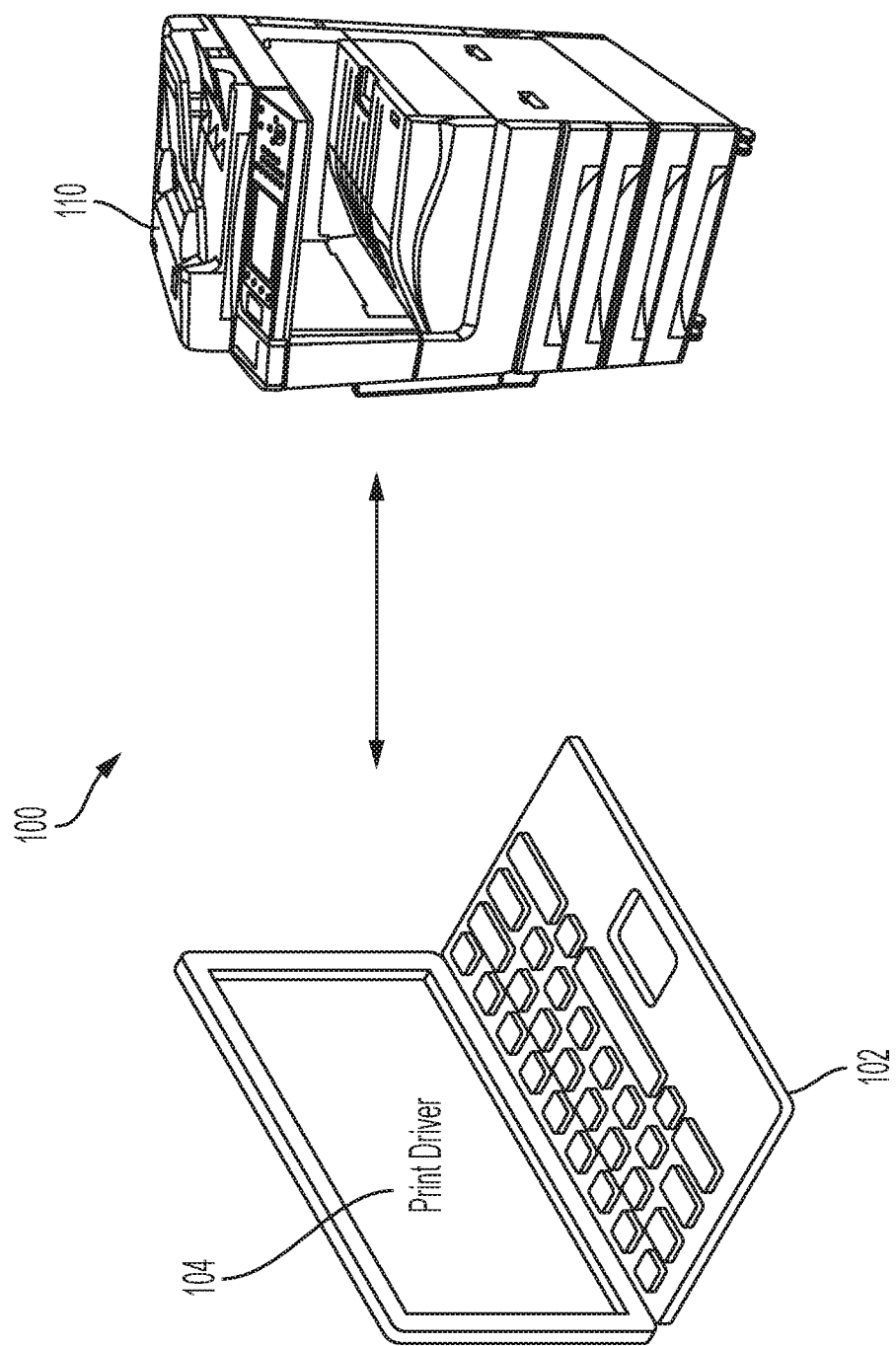
FIG. 1 shows an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The term "computing device" refers to device that a user typically uses for his day-to-day tasks such as giving print commands and other purposes. Examples of the computing device include, but are not limited to, a personal computer, a laptop, a mobile phone, a tablet, a Personal Digital Assistant (PDA), a smart-phone or any other device capable of data communication. The computing device includes a print driver application that allows the user to submit a document (also referred to as a print job) for printing and one or more print parameters for printing the document. The print parameters typically include such as print type, quality, destination, input trays, duplex, color, primary media such as paper, media size, media color, media type, or the like. In context of the present disclosure, the print driver includes an alternate media option that is provided to the user. The alternate media option includes one or more alternate media sizes for selection by the user. The alternate media option further allows the user to select an alternate media size to be used for printing the document.

As used herein, a "printer" is a single device or a combination of multiple devices, to do printing. In context of the present disclosure, the printer handles the document received for printing with the alternate media size as selected by the user. In some examples, the printer includes an alternate media option and provides the alternate media option to the user. The alternate media option allows the user to select the alternate media size to be used for printing the document. The printer prints the document with the alternate media size sheets. The printer includes multiple trays carrying various size sheets.

The term "document" refers to any document including content in the form of text, image, graphics, or a combination thereof. The document can be in a virtual or software form (embodied in a software file). The virtual form can also be referred to as digital form, electronic version, or the like. The document may be an input to the printer or to the print driver. The document sent for printing can be referred to as a print job. An output is the printed document.

The "primary media" refers to media size such as A4 (210×297 mm), initially selected by the user for printing the document. The "alternate media" refers to another media size to be used in place of the primary media size as initially selected by the user. One such example is A3 (297×420 mm). The "primary media size sheets" refer to all sheets/papers in the printer having the primary media size. Similarly, the "alternate media size sheets" refer to all sheets/paper in the printer having the alternate media size. The alternate media size may be used for printing the document when one or more scenarios occur such as when the primary media size sheets are not available with the printer, when the primary media size sheets are finished with the printer, when the primary media size sheets are not sufficient for printing the document such as the primary media size sheets are less than the total number of pages of the document to be printed or other scenarios.

The "count" refers to an estimated count of the primary media size sheets. Various methods may be used to estimate the count of the primary media size sheets such as using an optical sensor, checking the position of a bottom panel or the feed head in a tray or other methods.

Overview

The present disclosure discloses methods and systems for providing an alternate media option for a print job having a document and handling the same. The alternate media option is provided to a user via a print driver (when the document is submitted via the print driver) or a printer (when the document for printing is selected via the printer). The user selects the alternate media option for printing the job and the alternate media option displays one or more alternate media sizes. The option allows the user to select an alternate media size to be used for printing the job. The selected alternate media size is sent to a printer along with other print parameters including at least primary media size. If a count of the primary media size sheets is less than the total number of pages to be printed, then the print job is printed with the alternate media size sheets as selected by the user. The print job is scaled according to the alternate media size sheets so that content of the print job is not cropped, and the print job is printed as expected by the user without any intervention from the user, an admin, or otherwise.

The methods and systems avoid user intervention for loading media sheets in between jobs. The methods and systems utilize the available resources properly i.e., different media size sheets as available with the printer. The methods and systems avoid 'Held for resources' scenario as the job is not put on hold even when the primary media size sheets are less/unavailable/finished, etc. Moreover, the methods and systems avoid any waiting time for the user.

Exemplary Environment

FIG. 1 shows an exemplary environment 100 in which various embodiments of the disclosure may be practiced. The environment 100 includes a computing device 102 having a print driver 104, and a printer 110 communicatively coupled to the computing device 102 and/or the print driver 104. In this environment 100, the computing device 102 and the printer 110 collectively forms a system.

A user typically uses the computing device 102 for his daily tasks such as, emails, surfing, work, chat, prints, etc. Examples of the computing device 102 include, but are not limited to, a personal computer, a laptop, a mobile phone, a tablet, a Personal Digital Assistant (PDA), a smart-phone or any other device of data communication. The computing device 102 is coupled to the printer 110 through a communication network (although not shown). The communication network may be a wireless network, a wired network or a combination thereof. The communication network may be implemented as one of the different types of networks, such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. The communication network may further include a variety of network devices, including routers, bridges, servers, computing devices, storage devices, and the like.

The computing device 102 runs several applications and software for functioning of the computing device 102. One such example is a print driver application 104. The print driver 104 allows a user to give print commands and submit a document for printing. The print driver 104 further allows the user to submit a number of print parameters for printing such as print all pages, print selected pages, double-sided print, single-sided print, black and white print, color print, orientation, print quality, job type, destination, media size, media type, media color, input tray, collate, number of copies, and so on. The media type includes various types of media such as plain, transparent, cardstock or the like. The media size refers to a size of the media type selected by the user such as A2 (420×594 mm), A3 (297×420 mm), A4 (210×297 mm), A5 (148×210 mm) and so on. The print driver 104 submits the document to the printer 110 for printing.

The document includes a plurality of pages and the document further may include various content types. The document may have text, images, graphics or a combination thereof. Various examples of the document may be a magazine, a multi-information booklet, study material, bank form and the like. Various formats of the document include, but are not limited to, Portable Document Format (PDF), Microsoft DOC format, Hypertext Markup Language (HTML) format, Extensible Markup Language (XML) format, Microsoft XLS format, and Tag Image File Format (TIFF).

In context of the present disclosure, the print driver 104 includes an alternate media option having one or more alternate media sizes for user's selection. Here, the alternate media option allows the user to select an alternate media size of the one or more media sizes, for the document to be printed. Here, the print driver 104 communicates with the printer 110 via bi-directional communication to obtain alternate media sizes available with the printer 110. Once obtained, the print driver 104 displays alternate media sizes to the user for selection. The user selects an alternate media size as per his choice and/or requirement. For example, if the alternate media sizes include A3, A5, A2, legal, etc., the user may select A3 as an alternate media size. But the user may also select from other options as an alternate media size. In some examples, the printer 110 may send additional information such as tray capacity/level along with the alternate media size. In this manner, the print driver 104 receives alternate media sizes from the printer 110 in real-time and further allows the user to select an alternate media size. The document is printed with the alternate media size sheets when the primary media size sheets are not available, or a count of the primary media size sheets is less than a total number of pages to be printed and other such scenarios. The alternate media size option is provided or displayed to the user before submitting the document to the printer 110. The document, the print parameters and the alternate media size are submitted to the printer 110.

The printer 110 receives the document, the print parameters and the alternate media size. The printer 110 checks a job queue and initiates printing the job. The printer 110 checks the primary media size sheets availability for printing the document. The printer 110 checks whether the document includes the alternate media option and further identifies the alternate media size from the job. Based on the availability of the primary media size sheets, the printer 110 prints all pages of the document with the alternate media size sheets. For example, if the printer 110 finds the primary media size sheets are not sufficient for printing the job, the printer 110 prints the job with the alternate media size sheets. In this manner, the printer 110 prints the complete print job without any intervention.

An example is considered where a user wishes to print a document of 100 pages. The user submits the document via a print driver 104 running on his computing device 102. At the time of submitting of the document, the user submits print parameters as required such as media size such as A4, orientation, one-side printing, double-side printing, black and white printing, color printing, print quality, output destination, job type, etc. The media size submitted here refers to primary media size. At the time of submitting the print parameters, an alternate media option is provided to the user. The user selects the alternate media option and provides an alternate media size, for example, A3 to be used for printing. The print driver 104 creates a print ticket and includes the document and all print parameters along with the alternate media size. The print ticket is sent to a printer 110. The printer 110 receives the print ticket and initiates processing of the print job. Before printing the job, the printer 110 checks the availability of A4 sheets and finds that the media A4 is finished due to other print jobs in a queue prior to the print job or less media availability with the printer 110. It can be considered that the printer 110 has 80 A4 media and 100 A3 media indicating that the printer 110 has insufficient primary media size sheets, i.e., A4 for printing the job. As a result, the printer 110 considers printing the job with the alternate media size sheets, i.e., A3. The printer 110 prints 100 pages with the alternate media size sheets, i.e., A3 as provided by the user at the time of submitting the print job. In this manner, the printer 110 prints the job without putting the job on hold or without any intervention when the primary media is not enough with the printer 110.

In the environment 100 of FIG. 1, the document for printing is submitted through the computing device 102. The document may be stored on the computing device 102 or may be downloaded on the computing device 102 from his email, cloud or the like. The document may be present in an external storage device such as Universal Serial Bus (USB), hard disk and the document can be accessed by connecting the external storage device to the computing device 102. But in other scenarios, the document to be printed may be stored in a memory of the printer 110 or may be downloaded from a network or stored over a shared location accessible through the printer 110. In such scenarios, the printer 110 provides an alternate media option to the user and handles the print job provided with the alternate media option. The printer 110 is shown in FIG. 2.

Figure 2:
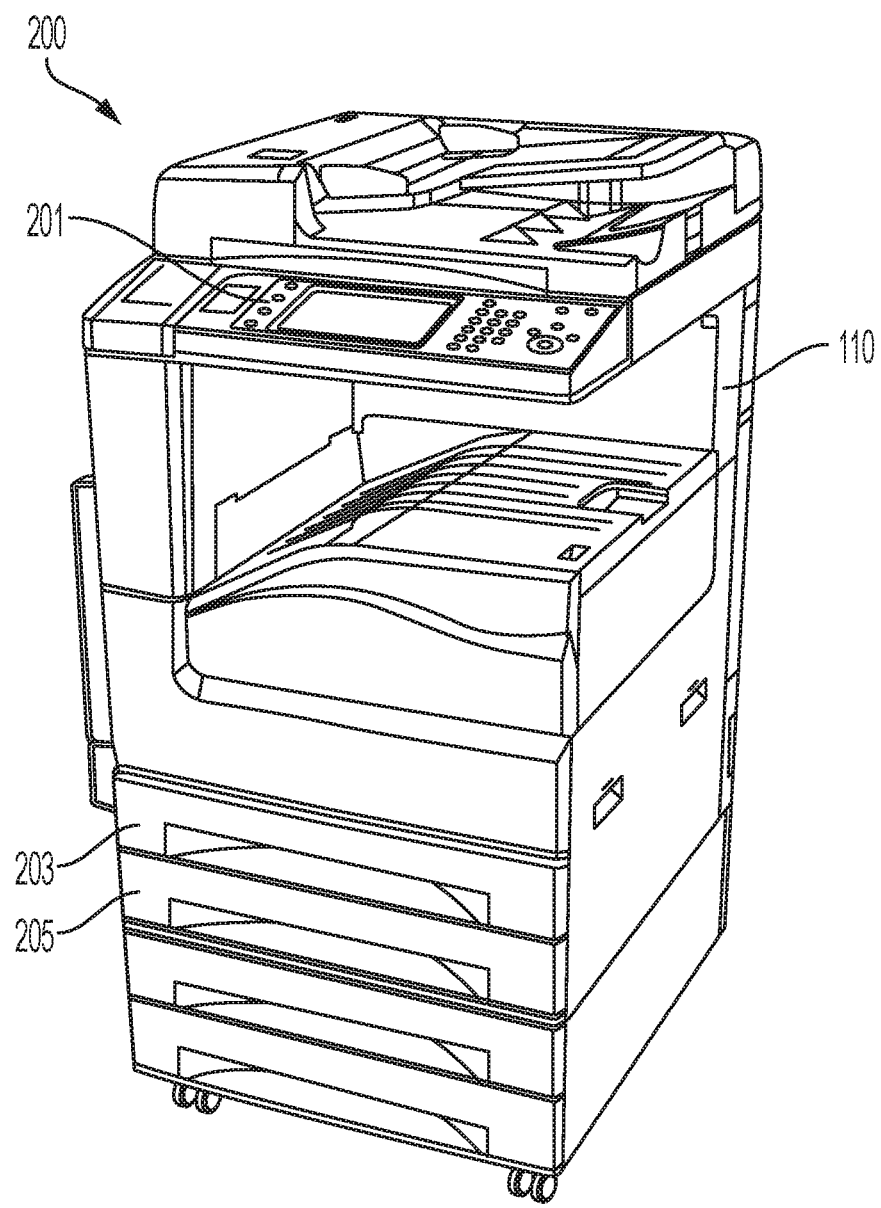
FIG. 2 shows another exemplary environment including a printer.

FIG. 2 shows another exemplary environment 200 in which various embodiments of the disclosure may be practiced. The environment 200 illustrates a physical printer 110. The printer 110 may be used by a number of users for one or more services such as print, email, scan, workflows, copy, fax, or the like. The printer 110 may be a single device or a combination of multiple devices to perform more than one function such as, but not limited to, printing, scanning, emailing, imaging, photocopying, and so forth. The printer 110 may include software, hardware, firmware, or a combination thereof. As depicted, the printer 110 is a standalone device but the printer 110 may be a part of a network without limiting the scope of the disclosure. As shown, the printer 110 includes a user interface 201. In such scenarios of FIG. 2, the document is selected directly via the printer 110 such as via a USB, a hard disk, a memory of the printer 110, cloud, email, etc. The printer 110 includes multiple trays carrying different media size sheets. For illustration purpose, the printer 110 is shown to include a first tray 203 and a second tray 205. The first tray 203 includes a plurality of primary media size sheets. The second tray 205 includes a plurality of alternate media size sheets.

In the environment 200 of FIG. 2, the document for printing is directly selected through the printer 110, for example, via a memory of the printer 110 or other examples as discussed above. After selecting and submitting the document for printing, a user interface 201 is provided. Through the user interface 201, the user provides print parameters such as primary media size, output, quality, destination, job type, or the like. In context of the present disclosure, the user interface 201 includes an alternate media option having one or more alternate media sizes and the option allows the user to select an alternate media size. The printer 110 receives the document, the print parameters and the alternate media size. Based on the availability of the primary media size sheets, the printer 110 prints the document with the alternate media size sheets.

In the environment 100 of FIG. 1, the alternate media option is included and provided via a print driver user interface. While in the environment 200 of FIG. 2, the alternate media option is included and provided via a user interface 201 of the printer 110. More details will be discussed below.

Exemplary System

Figure 3:
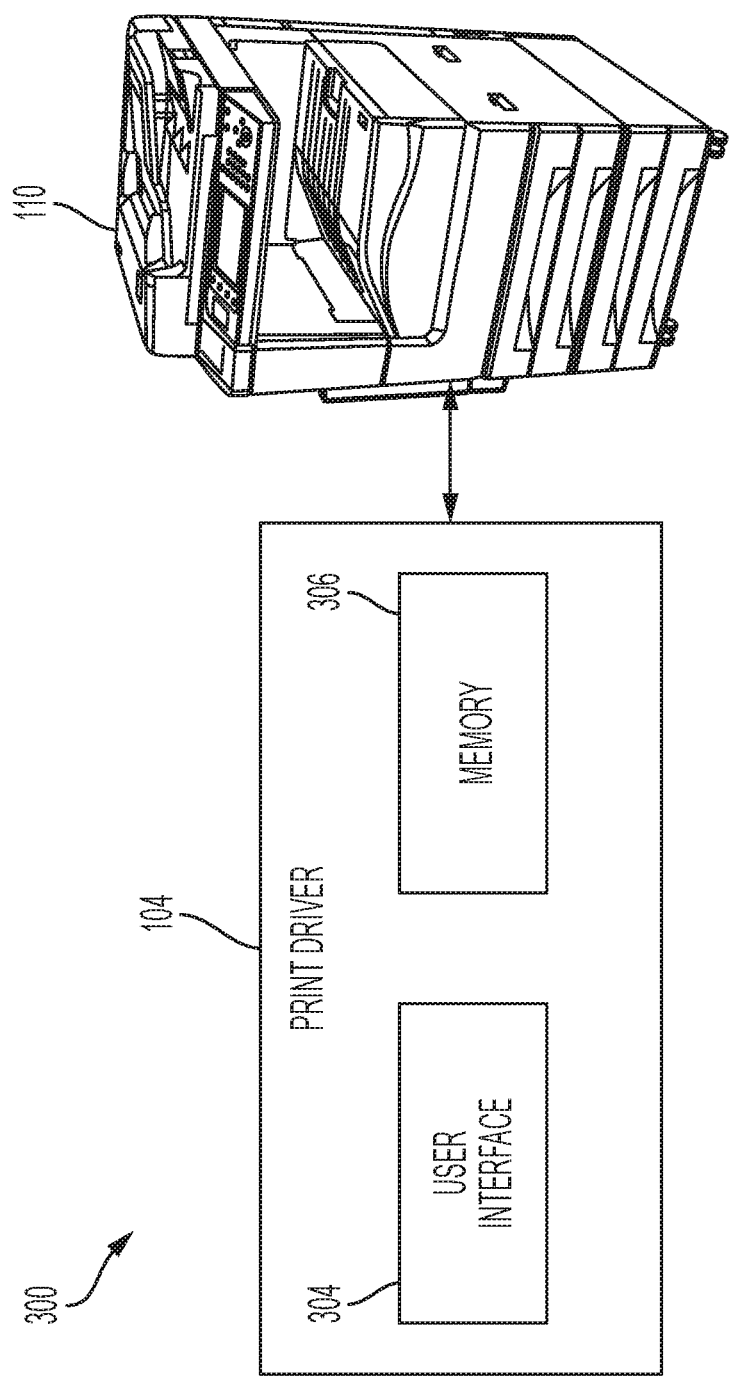
FIG. 3 is a block diagram illustrating various components of a device such as a computing device, in accordance with an embodiment of the present disclosure.

FIG. 3 is a block diagram 300 illustrating various components of a device such as a computing device 102. In another example, the device may be a printer. For simplicity, the present disclosure is discussed with respect to the print driver 104 of the computing device 102 in communication with the printer such as printer 110. But the disclosure can be implemented with respect to the printer 110. As shown, the computing device 102 includes a print driver 104 and a memory 306. The print driver 104 includes a user interface 304. Each of the components 102, 104, 304-306 is connected to each other via a conventional bus or a later developed protocol. Further, each of the components communicates with each other for performing various functions of the present disclosure. The computing device 102 is communicatively coupled to the printer 110.

A user submits a request for printing a document via the print driver 104. While submitting the document, the print driver 104 provides a print driver user interface 304 to the user. The user interface 304 provides/includes a number of print parameters such as job type, print quality, paper (primary media), destination, single-sided print, double-sided print, orientation, or the like. The user provides input for each of the print parameters. Else, the print driver 104 considers default values for each print parameter. According to the implementation of the present disclosure, the user interface 304 includes an alternate media option for the user. The alternate media option includes multiple alternate media sizes that are obtained from the printer 110 in real-time. The print driver 104 communicates with the printer 110 to obtain the alternate media sizes via bi-directional communication.

Figure 5A:
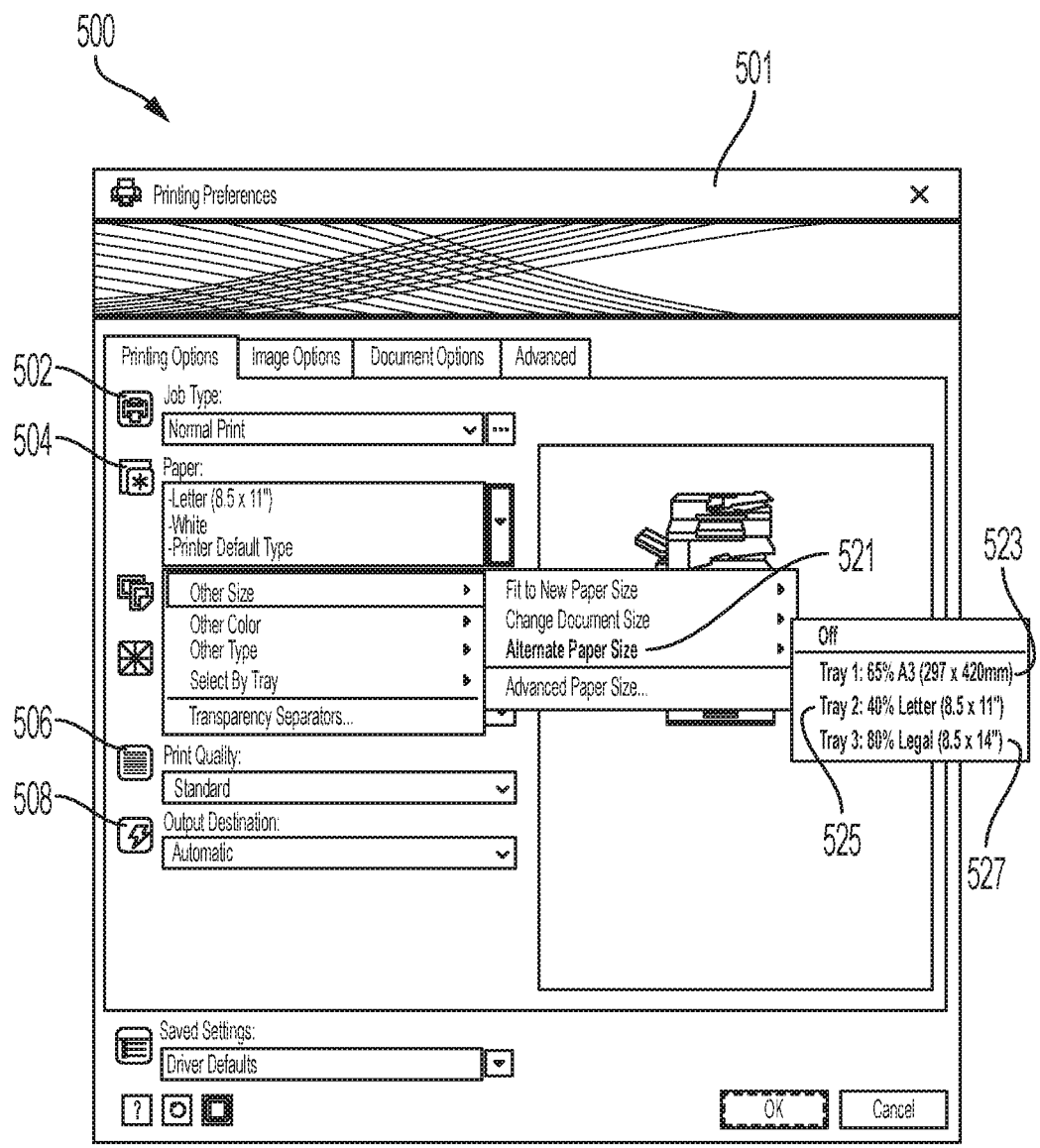
FIGS. 5A, 5B and 5C show one or more screen shots of a user interface, according to an exemplary embodiment of the present disclosure.

The print driver 104 requests the printer 110 to provide all media sizes available with the printer 110. The print driver 104 receives all media sizes and compares the primary media size as selected by the user with all media sizes as received from the printer 110. The print driver 104 excludes the primary media size and determines remaining media sizes as alternate media sizes. The print driver 104 then displays one or more alternate media sizes in the alternate media option. Along with the media sizes, the printer 110 may send tray level information as shown in FIG. 5A. For example, tray 1 having A3 media size with 65% capacity, tray 2 having letter with 40% capacity, and tray 3 having legal media with 80% capacity as shown in FIG. 5A. The tray level information includes an estimated percentage of the corresponding media. The media sizes and corresponding tray level information are real-time values and the printer 110 sends this information after a regular time interval such as 5 seconds, 10 seconds and so on. The print driver 104 receives the information and updates in the user interface 304 of the print driver 104 for the user.

The alternate media option allows the user to select an alternate media size for the print job. The alternate media size as selected by the user is to be used for printing when the primary media is not available with the printer 110, or the primary media is not sufficient for printing the job or is finished at the printer 110 or for other similar reasons. The user selects the alternate media option and provides the alternate media size to be used for printing the job. One exemplary snapshot of the print driver 104 is shown in FIG. 5A. The screenshot 500 shows a print driver user interface 501. The user interface 501 provides various print parameters such as job type 502, paper 504, print quality 506, output destination 508 and so on. In context of the present disclosure, the user interface 501 includes an option alternate paper size, marked as 521. The option 521 includes one or more alternate media sizes, marked as 523, 525 and 527. The option 521 allows the user to select an alternate media size for printing. The options 523, 525 and 527 represent input tray available with the printer 110 and show media size and its capacity available in each tray. For example, the option 523 represents tray 1 having A3 paper with 65% capacity. The option 525 represents tray 2 having letter paper with 40% capacity. The option 527 represents tray 3 having legal paper with 80% capacity. The user can select any of the options as an alternate media size. The information including the alternate media size and its capacity is obtained from the printer 110 in real-time.

In some scenarios, the user may not select the alternate media option because of a number of reasons. In such cases, the print driver 104 communicates with the printer 110 and receives a threshold value from the printer 110. The print driver 104 then calculates the total number of pages to be printed and further compares the total number of pages to be printed with the threshold value. Based on the comparison (discussed in detail below), a notification is generated for the user. The notification is displayed to the user for selecting the alternate media size. The notification is displayed to the user via the document itself. The notification may be displayed at any suitable place of the document such as top of the document, bottom of the document and so on. The notification is displayed before sending the document to the printer 110. In this way, the print driver 104 reminds the user to select/provide the alternate media size to be used for printing the document such that the document is printed without any intervention.

If the threshold value is not set with the printer 110, the printer 110 calculates the threshold value. The threshold value is the difference between the total of the primary media size sheets available in the printer 110 and the total number of pages to be printed, wherein Threshold value=primary media available in a printer (such as 110)−total number of pages to be printed;

If threshold value>=total number of pages to be printed/2 (50% of the pages to be printed), then the document can be printed with the primary media size sheets. Else, the document is printed with the alternate media size sheets, for example, if the total number of the primary media size sheets in the printer 110 is =100;

Total number of pages to be printed=80;

Threshold value=100−80=20;

If 20>=40 (80/2), i.e., false so the document is printed with the alternate media size sheets.

The threshold calculation varies based on the media type, media size, GSM (Grams per Square Meter), type of tray, types of sensor, type of printers, and so on. In general, it is 50% of the total number pages to be printed, but this may vary as required for implementing the present disclosure. 50% is just an example and may vary. The printer 110 may be given a threshold value for each tray. The threshold value is set to prevent the adverse effect of Job held for resource and to prevent sending alternate media size every time.

Few examples of how the threshold value may vary are discussed just for understanding purpose without limiting the scope of disclosure. For example, if the tray size is small, the threshold value may be little lower, if the tray size is large, threshold value may be higher. If GSM is high, threshold value may be lower. If GSM is low, threshold value may be higher. For production based Printers, the threshold value may be higher as it involves huge printing. For office printers, threshold value may be lower.

Figure 5B:
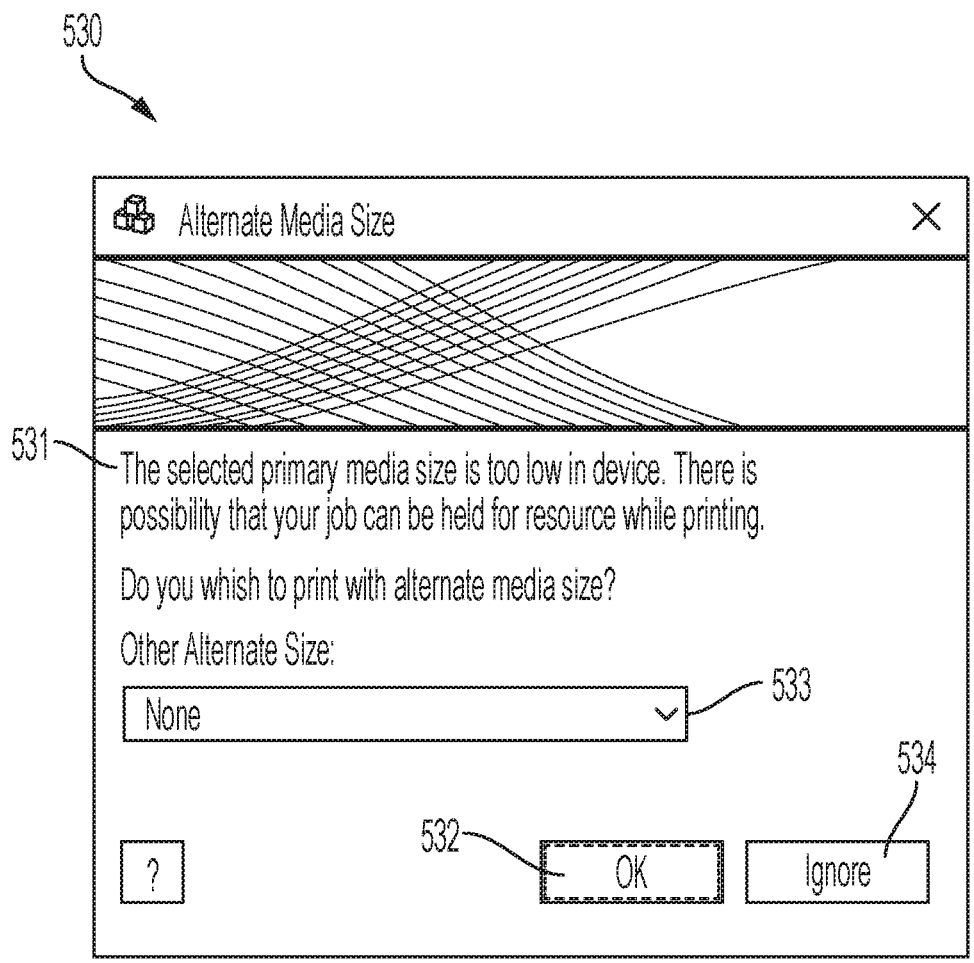

The threshold calculation and comparison are performed when the user has not selected the alternate media size and thus, a notification may help remind the user to select the alternate media size to be used for printing the document. The threshold calculation includes determination of whether the printer 110 has sufficient primary media size sheets for printing and if not, then the notification is to be displayed to the user for selecting the alternate media size. One exemplary screenshot 530 of the notification is displayed to the user as shown in FIG. 5B. The notification includes a message 531 for the user. The message 531 indicates to the user that the primary media size sheets is low in the printer 110 and asks the user to select an alternate media size. If the user wishes to select an alternate media size, the user may select a drop down list 533. A number of options are included in the drop down list 533. By clicking the drop down list 533, it lists one or more alternate media sizes currently available in the printer 110 as shown in the snapshot 540 of FIG. 5C. The drop down list 533 shows tray 1 having A3 sheets with 65% capacity (marked as 535), tray 2 includes letter sheets with 40% capacity (marked as 537), and tray 3 having legal sheets with 80% capacity (marked as 539). The user can select any of the displayed options and click ok via button 532. Here, by default, option None is selected. If user doesn't wish to select or print with alternate media size, the user can select ignore by clicking the ignore button 534. In such cases the print job may be printed with the primary media size sheets. Else, the user selects the alternate media size by selecting any of the options 535, 537 and 539. In this manner, the print driver 104 ensures the user selects and provides alternate media size to be used for printing the document.

The print driver 104 sends the document, the print parameters including at least primary media size and alternate media size as selected by the user to the printer 110. The details are sent in a format understandable by the printer 110.

The printer 110 receives the document, the print parameters and the alternate media size as selected by the user. The printer 110 adds the document in a print queue of the printer 110. Based on the print queue, the printer 110 starts processing the print job. Before processing the print job, the printer 110 checks the primary media size as selected by the user and further estimates a count of the primary media size sheets available with the printer 110.

The count of the primary media size sheets in a tray is estimated by, for example, using an optical sensor or gear tooth sensors. In another examples, the count of the primary media size sheets may be performed by checking the position of a bottom panel or the feed head in a tray, depending on the design. These methods provide the tray level or count of the primary media in terms of percentage. In the gear tooth sensors technique, the gear tooth sensor includes a sensor and a number of metal tooth along the height of the tray. Based on the primary media count, the sensor moves up and down the tooth. At empty, the total number of tooth available is identified. Based on the sensor inputs and based on the GSM of the primary media size sheets, the count of the primary media size sheets is taken. GSM denotes the weight/Thickness of the media size.

It can be considered that there are 200 tooth in a tray, each tooth equals to 0.5% of paper. The distance between each tooth is known and for example, the distance is as 0.4 cm/4 mm. The thickness of A4 sheet is ~0.05 mm. The number of sheets approximately available at 0.5% is 80 but may be in the range of 70 to 90. The lesser the distance between the tooth, the more accurate is the calculation.

In this way, the printer 110 estimates the count of the primary media size sheets. The printer 110 further checks the estimated count of the primary media size sheets against the total number of pages to be printed. If the estimated count of the primary media size sheets is equal to or greater than the total number of pages to be printed, the printer 110 prints the pages with the primary media size sheets. If the estimated count of the primary media size sheets is less than the total number of pages of the document to be printed, the printer 110 first identifies the alternate media size as selected by the user. The printer 110 prints the document with the alternate media size sheets. Before printing, the printer 110 scales content of the document without cropping according to the alternate media size. After scaling, the printer 110 prints the document with the alternate media size sheets. In this manner, the printer 110 completes printing of the print job without any intervention.

Figure 4:
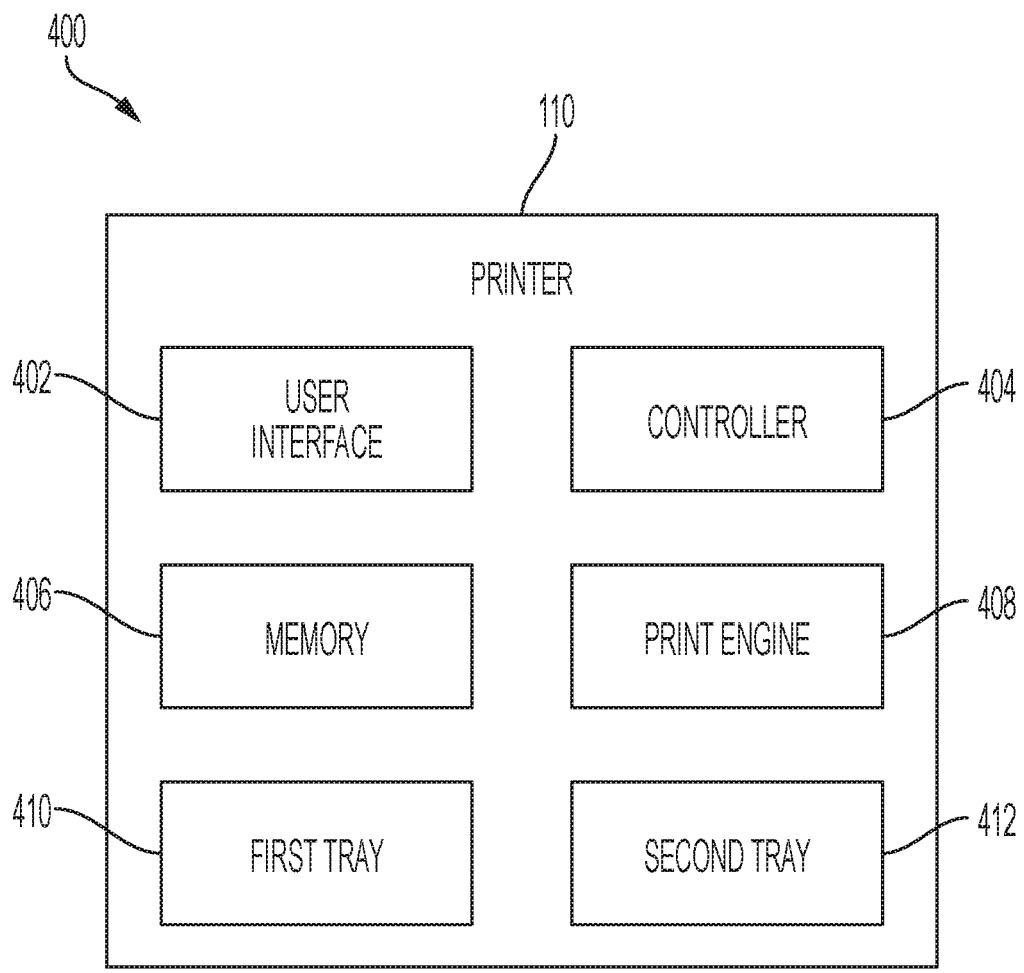
FIG. 4 is a block diagram illustrating components of a device such as a printer.

FIG. 4 is a block diagram 400 illustrating various components of a device such as the printer 110. The printer 110 includes a user interface 402, a controller 404, a memory 406, a print engine 408, a plurality of trays such as first tray 410 and a second tray 412. The printer 110 may include more trays but just for easy discussion, only two trays 410 and 412 are shown.

The first tray 410 includes a plurality of primary media size sheets. For example, the first tray 410 may include A4 sheets of size 210×297 mm. The second tray 412 includes a plurality of secondary media sheets. For example, the second tray 412 include A3 sheets having size 297×420 mm.

A user submits a document to the printer 110. The user selects the document for printing from the memory 406. The user may select the document for printing via network location such as a folder placed on a server. The user may select the document for printing via external storage device such as pen drive, hard disk etc. In such cases, the user may connect the external storage device to the printer 110 via a peripheral port. In this manner, the user selects the document and submits to the printer 110 for printing. The document includes a plurality of pages. Upon selecting the document, the printer 110 displays a user interface 402. The user interface 402 allows the user to submit one or more print parameters including at least a primary media size and other print parameters as discussed above. In context of the present disclosure, the user interface 402 provides an alternate media option to select an alternate media size to be used for printing. The alternate media option includes one or more alternate media sizes to be used for printing the document. The controller 404 checks all input trays for media sizes and estimates tray level of each tray in real-time. The controller 404 checks for the primary media size as input by the user and considers remaining media sizes as alternate media sizes. As a result, the controller 404 displays alternate media sizes in the alternate media option. For example, the controller 404 checks there are 4 input trays, tray 1 having A4, tray with A3, tray 3 having letter head, and tray 4 having legal. The controller 404 checks that A4 is the primary media size as provided by the user and determines A3, letter head and legal media as alternate media sizes. In this manner, the controller 404 checks input trays in real time, determines alternate media sizes in real-time and includes the determined alternate media sizes in the alternate media option.

Figure 6:
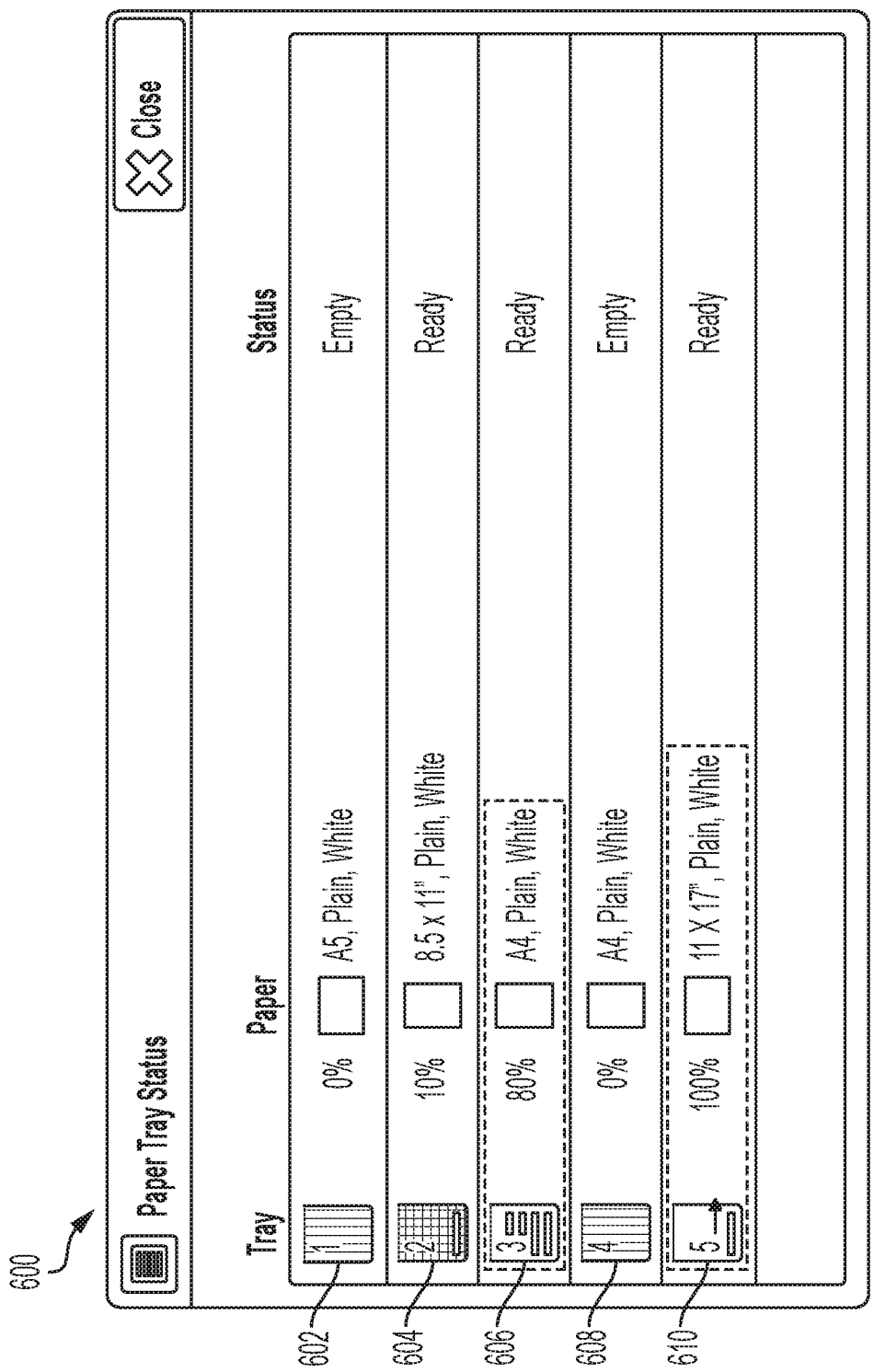
FIG. 6 shows an exemplary screen shot of a user interface of the printer.

One exemplary snapshot of the user interface 402 of the printer 110 is shown. The user interface 402 indicates tray level/status of each tray of the printer 110. As per the snapshot 600 of FIG. 6, five trays tray 1, tray 2, tray 3, tray 4, and tray 5, marked as 602, 604, 606, 608, and 610, respectively, are shown. The tray 1 (602) includes A5 sheets with 0% capacity, i.e., an empty tray, tray 2 (604) having sheets of size 8.5×11 inches with 10% capacity, tray 3 (606) having A4 sheets with 80% capacity, tray 4 (608) is empty and tray 5 (610) having 11×17 inches sheets with 100% capacity.

The controller 404 receives the document, the print parameters including the primary media size and the alternate media size to be used for printing. The controller 404 counts the total number of pages of the document to be printed. Before processing the print job, the controller 404 checks the availability of the primary media size sheets in the first tray 410. Here, the controller 404 estimates a count of the primary media size sheets in the first tray 410 using methods as discussed above. Based on the estimated count of the primary media size sheets, the controller 404 prints the document with the alternate media size sheets as selected by the user. In detail, the controller 404 further checks whether the estimated count of the primary media size sheets is less than the total number of pages to be printed. If so, the controller 404 sends instructions to the print engine 408. The print engine 408 prints the document with the alternate media size sheets based on the availability of the primary media. The print engine 408 pulls alternate media size sheets from the second tray 412 having the alternate media size sheets.

Before printing or sending instructions to the print engine 408, the controller 404 scales content of the document according to the alternate media size sheets selected by the user. The content is scaled such that content of the document fits on the alternate media size such as A3. In this manner, the printer 110 prints the document without any intervention.

Exemplary Flowchart

Figure 7:
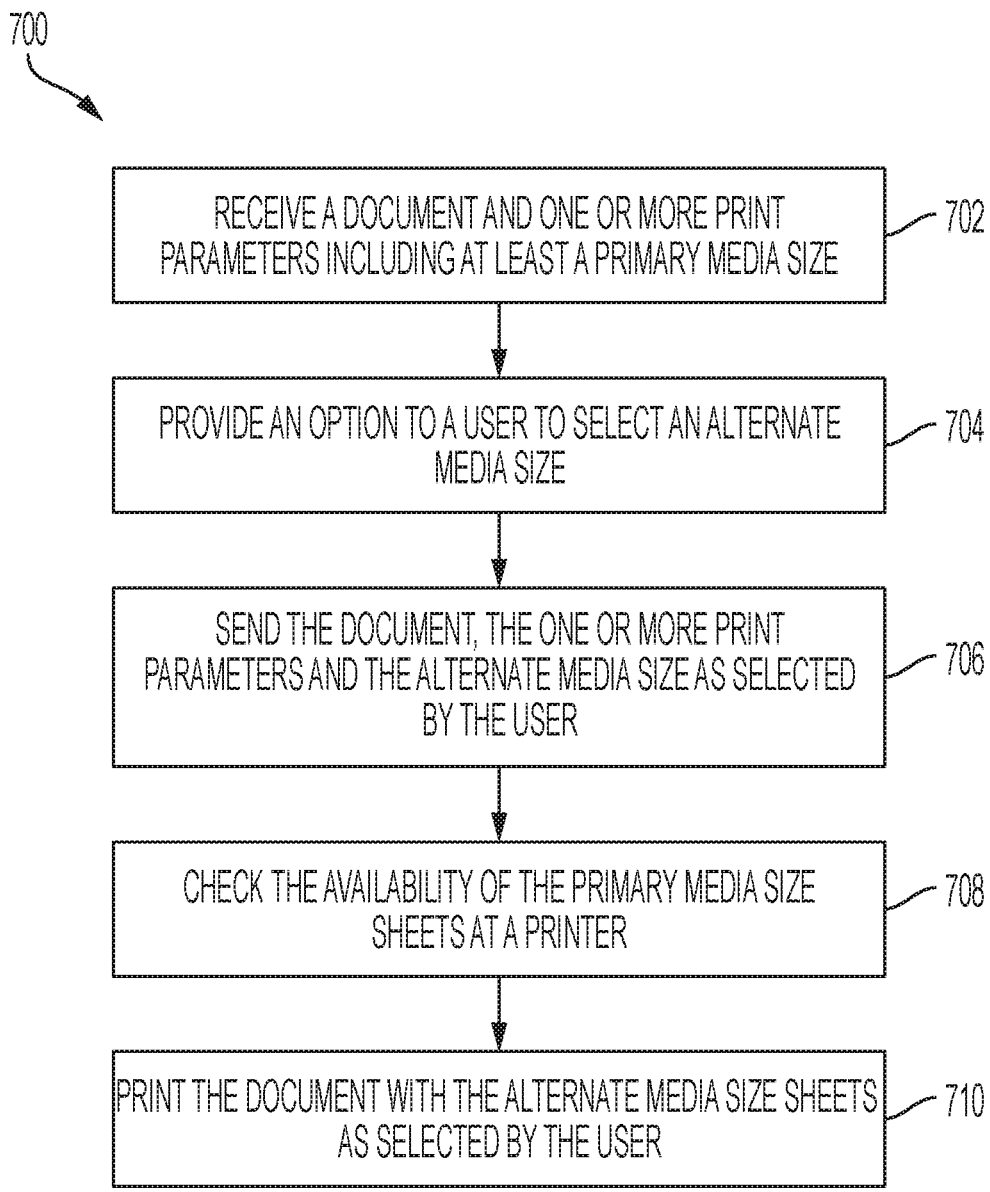
FIG. 7 is a flowchart for printing a document submitted from the computing device.

FIG. 7 is an exemplary method 700 for printing a print job including a document. The flowchart 700 provides an alternate media option for selecting an alternate media size and handles the print job selected with the alternate media size. According to the method flowchart 700, the document for printing is submitted via a computing device such as 102. For example, the document may be selected from a memory of the computing device. In another example, the document may be selected via an external storage device connected to the computing device. In further example, the document may be selected via a network location accessible through the computing device. Some blocks of the flowchart 700 may be implemented at the computing device, specifically at a print driver of the computing device, and some blocks may be implemented at a printer side. In some embodiments, the method flowchart 700 can be implemented completely at a printer side and will be discussed in FIG. 8.

The method 700 begins when a user wishes to print a document such that the document can be printed in one go or without any intervention. The document may be any document such as a personal document, an official document, a form or the like. The document may have one or more pages. But for the sake of discussion, the document may have a plurality of pages. The document may have content in the form of text, images, graphics or a combination thereof. The document may be of any suitable format such as PDF, MS word, MS ppt as known in the art or later developed document.

At Computing Device Side

The user submits a print command/request for printing the document. While submitting the document, the user submits one or more print parameters such as job type, print quality, media size/type (referred to as a primary media size), a number of copies, black & white print, color print, orientation, etc. The document and the one or more print parameters including at least a primary media size are received from the user at 702. The print driver receives the document and the one or more parameters including the at least primary media size as selected by the user for printing the document. The primary media size refers to a media sheet of size "A" for printing the document, for example, A4. Upon receiving the print request from the user, a connection with the printer is established. Once the connection is established with the printer, the print driver requests for all media sizes available with the printer via bi-directional communication. The printer checks all trays available with the printer, identifies media sizes and tray level (i.e., capacity such 65%, 40%, and so on) of each tray. The printer sends all media sizes and tray level information to the print driver. The print driver receives all media sizes and tray level information from the printer. Then, all media sizes obtained from the printer are compared with the primary media size as selected by the user. Upon comparison, media sizes excluding the primary media size are determined as one or more alternate media sizes. In this manner, one or more alternate media sizes to be used for printing are determined in real-time.

In context of the present disclosure, the method 700 provides an alternate media option to the user, at 704. The alternate media option includes the one or more alternate media sizes as determined above and as can be seen in FIG. 5A. The user can select one of the one or more alternate media sizes as included in the alternate media option. The alternate media option allows the user to provide/select an alternate media size to be used for printing the document. The alternate media option is displayed while submitting the printing parameters. The print driver provides the alternate media option to the user and is displayed always to the user.

Then, a print ticket is created including the document, the print parameters including the at least primary media size and the alternate media size. The document, the print parameters and the alternate media size as selected by the user are sent to a printer (e.g., 110) for further processing at 706. Along with these, the total number of pages to be printed is calculated and sent to the printer. The print driver creates the print ticket and calculates the total number of pages to be printed.

In some cases, the user may not select or forget to select the alternate media size. In such cases, the print driver communicates with the printer to obtain a threshold value as set in the printer using bi-directional communication. Based on the threshold calculation and comparison as discussed above in detail, a notification is generated and displayed to the user to select an alternate media size. The threshold value is preset in the printer. In cases the threshold value is not preset, the printer calculates the threshold value and communicates to the print driver. The threshold value is added to prevent the scenario where some other job in queue might use the primary media size.

At Printer Side

The printer receives the document, the print job parameters, the alternate media size to be used for printing and the total number of pages to be printed. Upon receiving, the document is added to a print queue of the printer. Then, processing of the print job is initiated. Then, the print job parameters are checked/identified. For example, total number of pages to be printed, primary media size, alternate media size, etc., are identified. The availability of the primary media size sheets is checked for printing the document, at 708. The availability of the primary media size sheets is checked by estimating a count of the primary media size sheets in a tray. The estimated count of the primary media size sheets is compared with the total number of pages to be printed. If the estimated count of the primary media size sheets is equal to or greater than the total number of pages to be printed, the document is printed with the primary media size sheets. If the estimated count of the primary media size sheets is less than the total number of pages to be printed, the method proceeds further.

Based on the comparison, the document is printed with the alternate media size sheets at 710. The document is printed with the alternate media size sheets when the estimated count of the primary media size sheets available at the printer is less than the total number of pages of the document to be printed. For example, if there is a document having 30 pages and an estimated count of the primary media size sheets is 23 (approximately), then the document, i.e., 30 pages of the document are printed with the alternate media size sheets. Before printing, content of the pages is scaled according to the alternate media size as selected by the user, without cropping, etc. Scaling is the new position on which the existing document is printed. For example, scaling includes converting A4 document to print on a letter paper. The process of scaling may shrink or expand the document. The PPI (Pixels Per Inch) may be reduced or increased based on scaling. Based on PPI only the content is scaled. Higher the PPI, greater the quality of the printing.

In this manner, the document is printed in one go without intervention even when the primary media size sheets are not available, not sufficient or finished at the printer. As a result, no intervention from the user or from an administrator is required to fill the printer with the required media, i.e., primary media sheets when the media is not available, not sufficient or finished.

Figure 8:
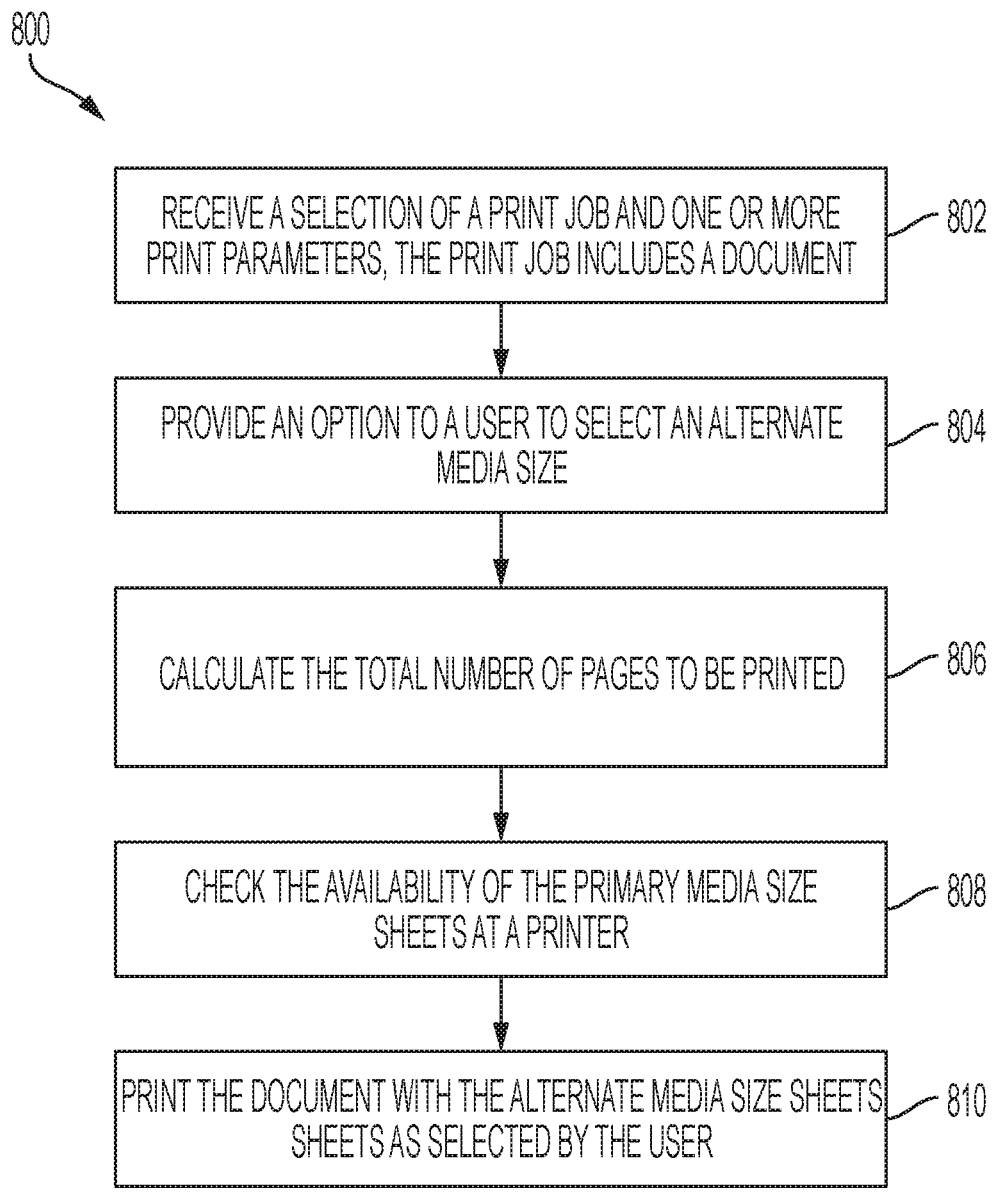
FIG. 8 is another flowchart for printing a document submitted from the printer.

FIG. 8 is a flowchart 800 for printing a document at a printer. According to the method flowchart 800, a print job, i.e., a document for printing is submitted via the printer. For example, the document may be selected from a memory of the printer. In another example, the document may be selected via an external storage device, which is connected to the printer. In further example, the document may be selected from a network location accessible via the printer. The method 800 is implemented at the printer, i.e., all method blocks are implemented at the printer.

The method 800 begins with when a user selects a document for printing. The document includes a plurality of pages. After selecting the document, the user provides one or more print parameters for printing the document. The one or more print parameters includes at least a primary media size for printing. At 802, the selection of the print job and the one or more print parameters including the at least primary media size are received from the user. Then, all media sizes available with the printer are checked. To this end, all trays available with the printer are checked to obtain media sizes and tray level. Then, all media sizes are compared with the primary media size as selected by the user. Upon comparison, one or more alternate media sizes are determined and are included in an option, i.e., an alternate media option. At 804, an option is provided to the user to select an alternate media size to be used for printing the document. Then, at 806, the total number of pages of the document to be printed is calculated. Before initiating processing of the print job, the availability of the primary media size sheets is checked at the printer at 808. The availability of the primary media size sheets is checked by estimating a count of the primary media size sheets at the printer. Based on the availability of the primary media size sheets at the printer, the document is printed with the alternate media size sheets at 810. For example, the document is printed with the alternate media size sheets when the estimated count of the primary media size sheets is less than the total number of pages to be printed. Before printing the document, the content of the document is scaled according to the alternate media size selected by the user. In this way, the method allows printing the job without any intervention.

As per the present disclosure, an alternate media option having one or more alternate media sizes, is provided to the user. The one or more alternate media sizes are displayed to the user for selection. The one or more alternate media sizes can be directly obtained from the printer or can be determined by the print driver. In the former case, the print driver communicates with the printer and requests the printer to share all alternate media sizes available with the printer/tray. Here, the print driver communicates the primary media size as selected by the user to the printer. And the printer checks all media sizes as available with the printer and compares with the primary media size as communicated by the print driver. Upon comparison, the printer eliminates the primary media size as available and considers remaining media sizes as alternate media sizes. As a result, the printer provides alternate media sizes as available with the printer. In the latter case, the print driver communicates with the printer and requests the printer to share all media sizes available with the printer/tray. The print driver receives all media sizes from the printer. The print driver then compares all media sizes with the primary media size as selected by the user and determines alternate media size based on the comparison. In this manner, one or more alternate media sizes are obtained/determined and included in the alternate media option in real-time in the user interface of the print driver or of the printer.

Figure 5C:
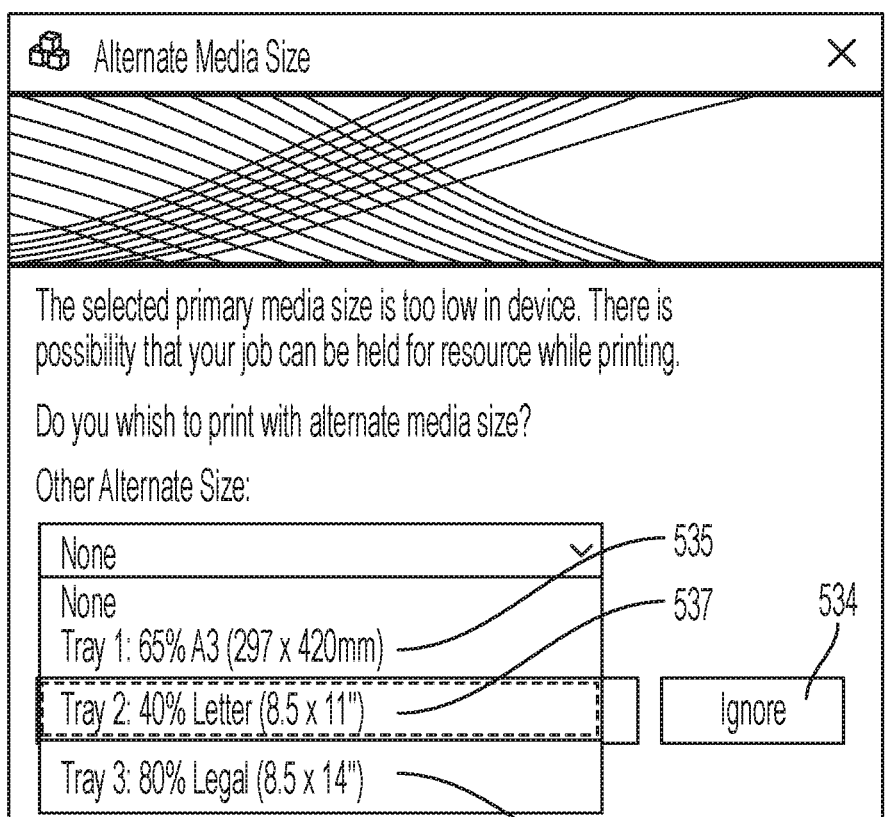

The user interface as shown in FIGS. 5A-5C illustrating an alternate media option/alternate paper size are exemplary in nature and may vary based on the device such as a printer.

The present disclosure can be implemented in various ways. For example, some functionalities can be implemented at a print driver, while some functionalities can be implemented at a printer. In another example, all functionalities can be implemented at printer's side. In further example, some functionalities can be implemented at a server, while some functionalities can be implemented at a printer. These are few examples and the disclosure can be implemented in any possible manner.

The methods and systems print a job without any intervention when primary media size sheets are insufficient/not available/finished at a printer. In this manner, the print job is printed to its completion that is acceptable to the user. The present disclosure provides a facility to print the job with alternate media size sheets when the primary media size sheets are not sufficient/finished/unavailable to print the job. The present disclosure avoids user intervention for loading media in between jobs. Further, the disclosure utilizes available resources properly and avoids "held for resources" scenarios.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, sending, checking, estimating, identifying, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing a document, comprising:
   receiving a request for printing a document and one or more print parameters, the one or more print parameters comprising at least a primary media size selected by a user for printing the document;
   providing an alternate media option to the user to select an alternate media size to be used for printing the document, wherein the alternate media option comprises one or more alternate media sizes for selection, and wherein the one or more alternate media sizes are obtained from a printer in real-time;
   generating and displaying a notification to the user via the document for selecting an alternate media size based on a threshold value;
   sending the document, the one or more print parameters and the alternate media size selected from the one or more alternate media sizes by the user to the printer;
   before printing the document, estimate a count of the primary media size sheets available with the printer; and
   based on the estimated count, printing the document with the alternate media size sheets.

2. The method of claim 1, further comprising receiving all media sizes available with the printer.

3. The method of claim 1, further comprising determining one or more alternate media sizes to be included in the alternate media option.

4. The method of claim 1, further comprising calculating the total number of pages of the document to be printed.

5. The method of claim 1, further comprising receiving the threshold value from the printer.

6. The method of claim 1, further comprising printing the document with the alternate media size sheets when the estimated count of the primary media size sheets available at the printer is less than the total number of pages of the document to be printed.

7. The method of claim 1, further comprising scaling content of the document according to the selected alternate media size.

8. A method for printing a print job at a printer, comprising:
   receiving a selection of a print job with one or more print parameters, the one or more print parameters comprising at least a primary media size for printing, the print job comprising a document having a plurality of pages;
   providing an option to the user to select an alternate media size to be used for printing the document, wherein the option comprises one or more alternate media sizes for selection, and wherein the one or more alternate media sizes are obtained from the printer in real-time;
   generating and displaying a notification to the user via the document for selecting an alternate media size based on a threshold value;
   calculating the total number of pages of the document to be printed;
   before initiating processing the print job, checking the availability of the primary media size sheets at the printer for printing the document; and
   based on the availability of the primary media size sheets at the printer, printing the document with the alternate media size sheets,
   wherein the method allows printing the print job without any intervention.

9. The method of claim 8, further comprising checking all media sizes available with the printer.

10. The method of claim 8, further comprising determining one or more alternate media sizes to be included in the option.

11. The method of claim 8, wherein checking the availability of the primary media size sheets comprises estimating a count of the primary media size sheets at the printer.

12. The method of claim 11, further comprising printing the document with the alternate media size sheets when the estimated count of the primary media size sheets is less than the total number of pages to be printed.

13. The method of claim 8, further comprising scaling content of the document according to the alternate media size selected by the user.

14. A system, comprising:
   a computing device having a print driver to:
      receive a request for document printing and one or more print parameters, the one or more print parameters comprising at least a primary media size selected by a user for printing the document;
      provide an option to the user to select an alternate media size to be used for printing the document, wherein the option comprises one or more alternate media sizes for selection, and wherein the one or more alternate media sizes are obtained from a printer in real-time;
      generate and display a notification to the user via the document for selecting an alternate media size based on a threshold value;
      send the document, the one or more print parameters along with the alternate media size selected from the one or more alternate media sizes by the user to the printer; and
   the printer communicatively coupled to the computing device, wherein the printer comprising a first tray comprising a plurality of primary media size sheets and a second tray comprising a plurality of alternate media size sheets, the printer is to:
      receive the document, the one or more print parameters along with the alternate media size selected by the user;
      before printing the document, estimate a count of the primary media size sheets available in the first tray; and based on the estimation, print the document with the alternate media size sheets in the second tray.

15. The system of claim 14, wherein the printer is to check the first tray and the second tray for media sizes.

16. The system of claim 14, wherein the print driver is to determine one or more alternate media sizes to be included in the option.

17. The system of claim 14 wherein the print driver is to calculate the total number of pages of the document to be printed.

18. The system of claim 14, wherein the print driver is to receive the threshold value from the printer.

19. The system of claim 14, wherein the printer is to print the document with the alternate media size sheets when the estimated count of primary media size sheets is less than the total number of pages to be printed.

20. The system of claim 14, wherein the printer is to scale content of the document according to the selected alternate media size.

21. A printer for printing a document, the printer comprising:
   a first tray comprising a plurality of primary media size sheets;
   a second tray comprising a plurality of alternate media size sheets;
   a user interface to:
      allow a user to select a print job and one or more print parameters, the one or more print parameters comprising at least a primary media size, the print job comprising a document having a plurality of pages; and
      provide an alternate media option, wherein the alternate media option comprises one or more alternate media sizes for selection, and wherein the one or more alternate media sizes are obtained from the printer in real-time;
      generate and display a notification to the user via the document for selecting an alternate media size based on a threshold value;
      allow the user to select an alternate media size from the one or more alternate media sizes for printing the document; and
   a controller to:
      receive the print job with one or more print parameters and the alternate media size to be used for printing the document;
      calculate the total number of pages to be printed;
      before processing the print job, check the availability of the primary media size sheets available in the first tray for printing the document; and
      based on the availability of the primary media size sheets in the first tray, print the document with the alternate media size sheets available in the second tray,
      wherein the printer prints the print job without any intervention.

22. The printer of claim 21 is to check the first tray and the second tray for media sizes.

23. The printer of claim 21 is to determine one or more alternate media sizes to be included in the option.

24. The printer of claim 21, wherein the controller is to further estimate a count of the primary media size sheets in the first tray.

25. The printer of claim 24 is to print the document with the alternate media size sheets when the estimated count of the primary media size sheets is less than the total number of pages to be printed.

26. The printer of claim 21, wherein the controller is to further scale content of the document according to the alternate media size selected by the user.

\* \* \* \* \*